(12) United States Patent
Bradley et al.

(10) Patent No.: US 11,002,700 B2
(45) Date of Patent: May 11, 2021

(54) HIGH TEMPERATURE GAS SENSOR

(71) Applicant: Honeywell International Inc., Morris Plains, NJ (US)

(72) Inventors: Alistair David Bradley, Hilliard, OH (US); Ronald W. Myers, Dublin, OH (US); Karen Marie Newstrom-Peitso, Hopkins, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 255 days.

(21) Appl. No.: 16/198,688

(22) Filed: Nov. 21, 2018

(65) Prior Publication Data

US 2019/0154613 A1   May 23, 2019

Related U.S. Application Data

(60) Provisional application No. 62/589,187, filed on Nov. 21, 2017.

(51) Int. Cl.
*G01N 27/12* (2006.01)
*G01N 27/22* (2006.01)
*G01N 27/407* (2006.01)

(52) U.S. Cl.
CPC ......... *G01N 27/128* (2013.01); *G01N 27/227* (2013.01); *G01N 27/4072* (2013.01)

(58) Field of Classification Search
CPC .................................................... G01N 27/128
USPC ....................................................... 73/31.05
See application file for complete search history.

(56) References Cited

U.S. PATENT DOCUMENTS

| | | | |
|---|---|---|---|
| 3,886,785 A | 6/1975 | Stadler et al. | |
| 3,911,386 A | 10/1975 | Beaudoin et al. | |
| 3,928,161 A | 12/1975 | McIntyre et al. | |
| 3,936,794 A | 2/1976 | Beaudoin et al. | |
| 3,940,327 A | 2/1976 | Wagner et al. | |
| 4,040,930 A | 8/1977 | Dillon | |
| 4,130,797 A | 12/1978 | Hattori et al. | |
| 4,277,323 A | 7/1981 | Muller et al. | 204/195 S |
| 4,282,080 A | 8/1981 | Muller et al. | 204/195 S |
| 4,283,261 A | 8/1981 | Maurer et al. | 204/195 S |
| 4,300,990 A | 11/1981 | Maurer | 204/195 S |
| 4,305,803 A | 12/1981 | Beyer et al. | 204/195 S |
| 4,305,903 A | 12/1981 | Krause | |
| 4,310,401 A | 1/1982 | Stahl | 204/195 S |
| 4,368,431 A | 1/1983 | Rohr et al. | |

(Continued)

FOREIGN PATENT DOCUMENTS

| | | |
|---|---|---|
| EP | 0936461 | 8/1999 |
| GB | 1467735 | 3/1977 |

(Continued)

*Primary Examiner* — Walter L Lindsay, Jr.
*Assistant Examiner* — Philipmarcus T Fadul
(74) *Attorney, Agent, or Firm* — Alston & Bird LLP

(57) ABSTRACT

A gas sensor for sensing a gas of interest includes a ceramic carrier and a porous ceramic lid that is secured to the ceramic carrier. The porous ceramic lid and the ceramic carrier together define a sensor cavity. A gas sensor is situated in the sensor cavity and is spaced from the porous ceramic lid. The porous ceramic lid is configured to allow the gas of interest to move through at least part of the porous ceramic lid and into the sensor cavity to be sensed by the gas sensor. In some cases, the gas sensor is a MEMS gas sensor.

18 Claims, 8 Drawing Sheets

(56) References Cited

U.S. PATENT DOCUMENTS

| | | | |
|---|---|---|---|
| 4,413,502 A | 11/1983 | Ohta et al. | |
| 4,414,531 A | 11/1983 | Novak | |
| 4,419,212 A | 12/1983 | Dietz et al. | 204/424 |
| 4,437,971 A | 3/1984 | Csanitz et al. | 204/427 |
| 4,489,596 A | 12/1984 | Linder et al. | 73/116 |
| 4,535,316 A | 8/1985 | Wertheimer et al. | |
| 4,556,475 A | 12/1985 | Bayha et al. | 204/427 |
| 4,560,463 A | 12/1985 | Frey et al. | 204/424 |
| 4,609,454 A | 9/1986 | Ziegler | 204/427 |
| 4,636,293 A | 1/1987 | Bayha et al. | 204/428 |
| 4,736,618 A | 4/1988 | Usami et al. | |
| 4,756,885 A | 7/1988 | Raff et al. | 422/98 |
| 5,246,562 A | 9/1993 | Weyl et al. | 204/424 |
| 5,625,156 A | 4/1997 | Serrels et al. | |
| 5,942,092 A | 8/1999 | Weyl et al. | 204/424 |
| 5,955,656 A | 9/1999 | Graser et al. | 73/23.31 |
| 6,018,982 A | 2/2000 | Friese et al. | 73/23.2 |
| 6,164,120 A | 12/2000 | Friese et al. | 73/23.2 |
| 6,206,377 B1 | 3/2001 | Weyl | 277/317 |
| 6,223,583 B1 | 5/2001 | Friese et al. | 73/23.31 |
| 6,257,573 B1 | 7/2001 | Munoz et al. | |
| 6,273,432 B1 | 8/2001 | Weyl et al. | 277/591 |
| 6,311,453 B1 | 11/2001 | Mechnick | 52/749.1 |
| 6,319,376 B1 | 11/2001 | Graser et al. | 204/424 |
| 6,344,134 B1 | 2/2002 | Yamada et al. | 205/781 |
| 6,347,543 B1 | 2/2002 | Geier et al. | 73/23.31 |
| 6,352,632 B1 | 3/2002 | Inagaki et al. | 204/425 |
| 6,375,828 B2 | 4/2002 | Ando et al. | 205/781 |
| 6,408,680 B2 | 6/2002 | Friese et al. | 73/23.31 |
| 6,432,288 B1 | 8/2002 | Nielsen et al. | |
| 6,474,655 B1 | 11/2002 | Weyl et al. | 277/650 |
| 6,487,890 B1 | 12/2002 | Weyl et al. | 73/23.31 |
| 6,527,573 B2 | 3/2003 | Stein, Sr. et al. | 439/260 |
| 6,585,872 B2 | 7/2003 | Donelon et al. | 204/424 |
| 6,613,206 B1 | 9/2003 | Weyl et al. | 204/424 |
| 6,672,132 B1 | 1/2004 | Weyl et al. | 73/23.31 |
| 6,672,900 B2 | 1/2004 | France et al. | |
| 6,766,817 B2 | 7/2004 | da Silva | |
| 6,918,404 B2 | 7/2005 | Dias da Silva | |
| 7,021,354 B2 | 4/2006 | Kobayashi et al. | |
| 7,066,586 B2 | 6/2006 | da Silva | |
| 7,159,447 B2 | 1/2007 | Nakagawa | |
| 7,338,202 B1 | 3/2008 | Kapat et al. | |
| 8,359,902 B2 | 1/2013 | Thanigachalam et al. | |
| 9,494,543 B2 | 11/2016 | Moon et al. | |
| 9,506,392 B2 | 11/2016 | Fix et al. | |
| 9,574,947 B2 | 2/2017 | Cole et al. | |
| 9,910,023 B2 | 3/2018 | Ui et al. | |
| 10,126,223 B2 | 11/2018 | Kim et al. | |
| 2002/0048991 A1 | 4/2002 | France et al. | 439/587 |
| 2003/0160844 A1 | 8/2003 | da Silva | |
| 2004/0077201 A1 | 4/2004 | Kobayashi et al. | 439/190 |
| 2004/0159547 A1 | 8/2004 | Haraguchi et al. | 204/424 |
| 2004/0187919 A1 | 9/2004 | da Silva | |
| 2004/0196338 A1 | 10/2004 | da Silva | |
| 2004/0237529 A1 | 12/2004 | da Silva | |
| 2005/0109081 A1* | 5/2005 | Zribi | G01N 25/4873 73/31.05 |
| 2005/0160840 A1 | 7/2005 | Allmendinger | |
| 2008/0016946 A1 | 1/2008 | Thanigachalam et al. | |
| 2008/0206107 A1 | 8/2008 | Thanigachalam et al. | |
| 2011/0126612 A1* | 6/2011 | Shimizu | G01N 27/12 73/31.05 |
| 2011/0138882 A1 | 6/2011 | Moon et al. | |
| 2012/0103058 A1 | 5/2012 | Maeda et al. | |
| 2017/0038273 A1 | 2/2017 | Krauss et al. | |
| 2017/0122898 A1 | 5/2017 | Akasaka | |
| 2018/0106745 A1 | 4/2018 | Shibasaki et al. | |

FOREIGN PATENT DOCUMENTS

| | | |
|---|---|---|
| GB | 2166866 A | 5/1986 |
| GB | 2289944 A | 12/1995 |
| JP | 05052143 | 3/1993 |

* cited by examiner

HIGH TEMPERATURE GAS SENSOR

RELATED APPLICATIONS

This application claims the benefit of U.S. Provisional Application Ser. No. 62/589,187, entitled PACKAGING FOR MICROELECTROMECHANICAL SYSTEMS HIGH TEMPERATURE GAS SENSOR, and filed on Nov. 21, 2017, which application is incorporated by reference herein in its entirety.

TECHNICAL FIELD

The present disclosure pertains generally to gas sensors and more particularly to gas sensors that are configured for detecting a gas in a high temperature environment.

BACKGROUND

Gas sensors are used in a variety of different environments for detecting and/or quantifying a variety of different gases. For example, internal combustion engines utilize gas sensors to detect and/or quantify gas concentrations in an exhaust stream emanating from the internal combustion engine. In this example, gases of interest may include carbon monoxide (CO), carbon dioxide ($CO_2$), nitric oxide (NO), nitrogen dioxide ($NO_2$) and/or any other suitable gas of interest. Oxides of nitrogen are commonly referred to as $NO_x$ (where x is equal to 1 or 2). Continuing with this example, an engine management system of the internal combustion engine may utilize information regarding the gas concentrations to help improve performance of the engine while reducing pollution. It will be appreciated that gas sensors exposed to an exhaust gas stream need to operate at high temperature. A need remains for improved gas sensors, particularly those that are configured to operate at high temperatures.

SUMMARY

The disclosure relates generally to gas sensors for sensing gases of interest, such as in an engine exhaust stream. In a particular example of the disclosure, a gas sensor for sensing a gas of interest includes a ceramic carrier and a porous ceramic lid that is secured to the ceramic carrier. The porous ceramic lid and the ceramic carrier together define a sensor cavity. A gas sensor is situated in the sensor cavity and is spaced from the porous ceramic lid. The porous ceramic lid is configured to allow the gas of interest to move through at least part of the porous ceramic lid and into the sensor cavity to be sensed by the gas sensor.

In another example of the disclosure, a gas sensor for sensing a gas of interest includes a sensor die that defines a diaphragm with a gas sensing active region supported by a first side of the diaphragm and a heater for heating the gas sensing active region. The illustrative gas sensor includes a ceramic housing that defines a sensor cavity for housing the sensor die and that is configured to expose the gas sensing active region to the gas of interest, and to vent a second side of the diaphragm, opposite to the first side, to reduce a pressure differential across the diaphragm.

Another particular example of the disclosure may be found in a gas sensor for sensing a gas of interest. The gas sensor may include a sensor die that defines a diaphragm. A gas sensing active region is supported by the diaphragm, and the gas sensor includes a heater for heating the gas sensing active region. A ceramic housing may define a sensor cavity for housing the sensor die. The ceramic housing may include a plurality of ceramic layers, and at least some of the plurality of ceramic layer may include an aperture, trench or other opening that defines at least part of the sensor cavity.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE DRAWINGS

The disclosure may be more completely understood in consideration of the following description of various illustrative embodiments of the disclosure in connection with the accompanying drawings, in which.

Figure 1:
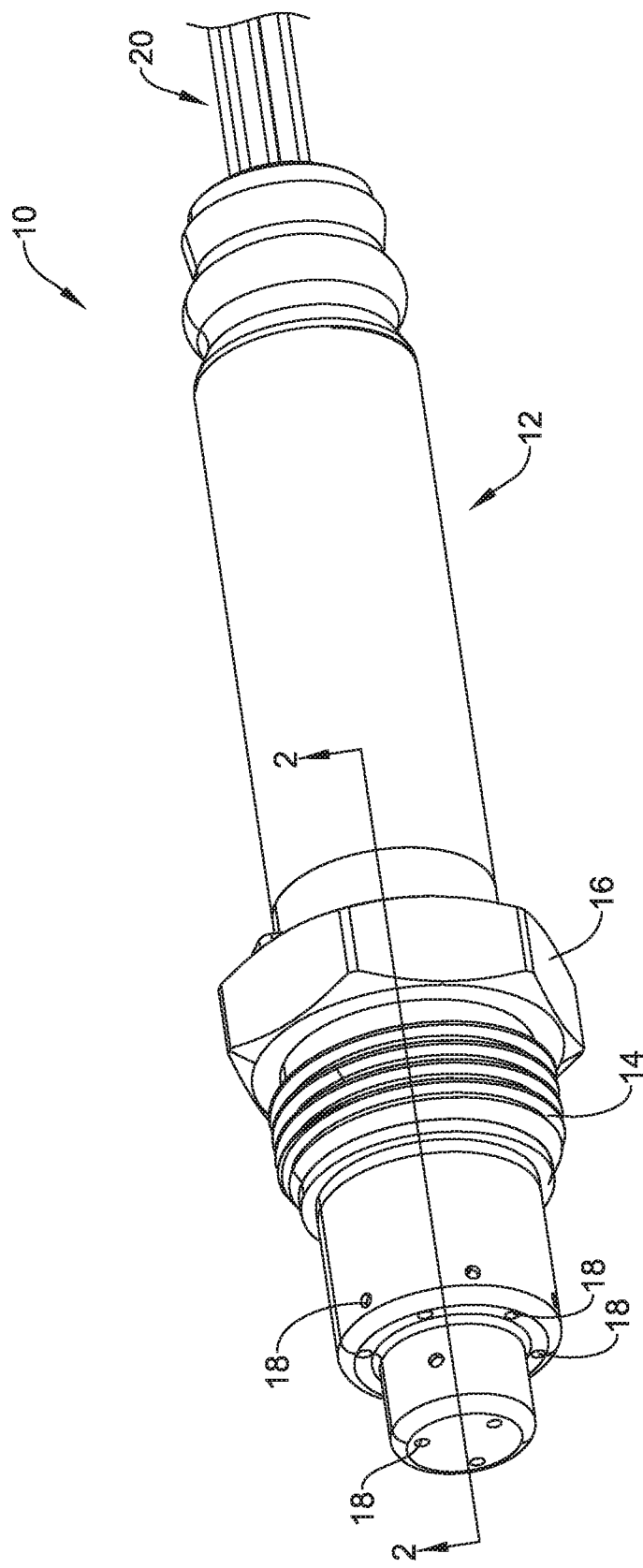
FIG. 1 is a perspective view of an illustrative gas sensor.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Gas sensors are used in a variety of different environments including, for example, industrial, military, marine and automotive environments. In one non-limiting example, gas sensors are often used for detecting various gases that are present within automotive exhaust streams. While theoretical combustion turns hydrocarbons (gasoline) and oxygen into water and carbon dioxide, combustion in reality provides a number of other gaseous components as well. Gas sensors may be used in sensing the presence and/or concentration of various gases such as $O_2$, $NO_2$, $NO_x$, $CO_2$, $NH_3$, or combinations thereof, in vehicle exhausts. For example, a gas sensor may be used to sense $NO_x$, which generically represents a variety of different oxides of nitrogen, including NO and $NO_2$. Improved sensing of NOx can lead to improved engine efficiency and reduced CO2/NOx emissions through improved operation of Selective Catalytic Reduction (SCR) systems. Accordingly, a modern internal combustion engine may include one or more gas sensors that are positioned such that they are exposed to exhaust gases of the engine. It will be appreciated that an engine is referenced merely as a possible environment for the gas sensors discussed herein, as gas sensors may be used in a variety of other environments as well.

FIG. 1 is a perspective view of an illustrative gas sensor 10 that is configured to be secured to a fitting (not shown) forming part of an automotive exhaust system. In some cases, the fitting may be secured to an exhaust manifold of the engine, but this is not required in all cases, as gas sensors may also be deployed further downstream. The illustrative gas sensor 10 includes a housing 12 that may be formed of a metal such as stainless steel. The housing 12 includes a threaded portion 14 and a nut portion 16. It will be appreciated that the threaded portion 14 of the housing 12 may be configured to be threadedly engaged with a corresponding threaded fitting within the exhaust system. The nut portion 16 may be used by an installer to rotate the gas sensor 10 and thus the threaded portion 14 to tighten the threaded portion 14 within the threaded fitting of the exhaust system. The illustrative housing 12 also defines a number of apertures 18 that allow exhaust gases from the exhaust system to enter an interior of the gas sensor 10. The illustrative gas sensor 10 also includes electrical couplings 20 that are electrically connected with a sensor within the gas sensor 10, and are configured to be electrically connected with an engine controller or the like.

Figure 2:
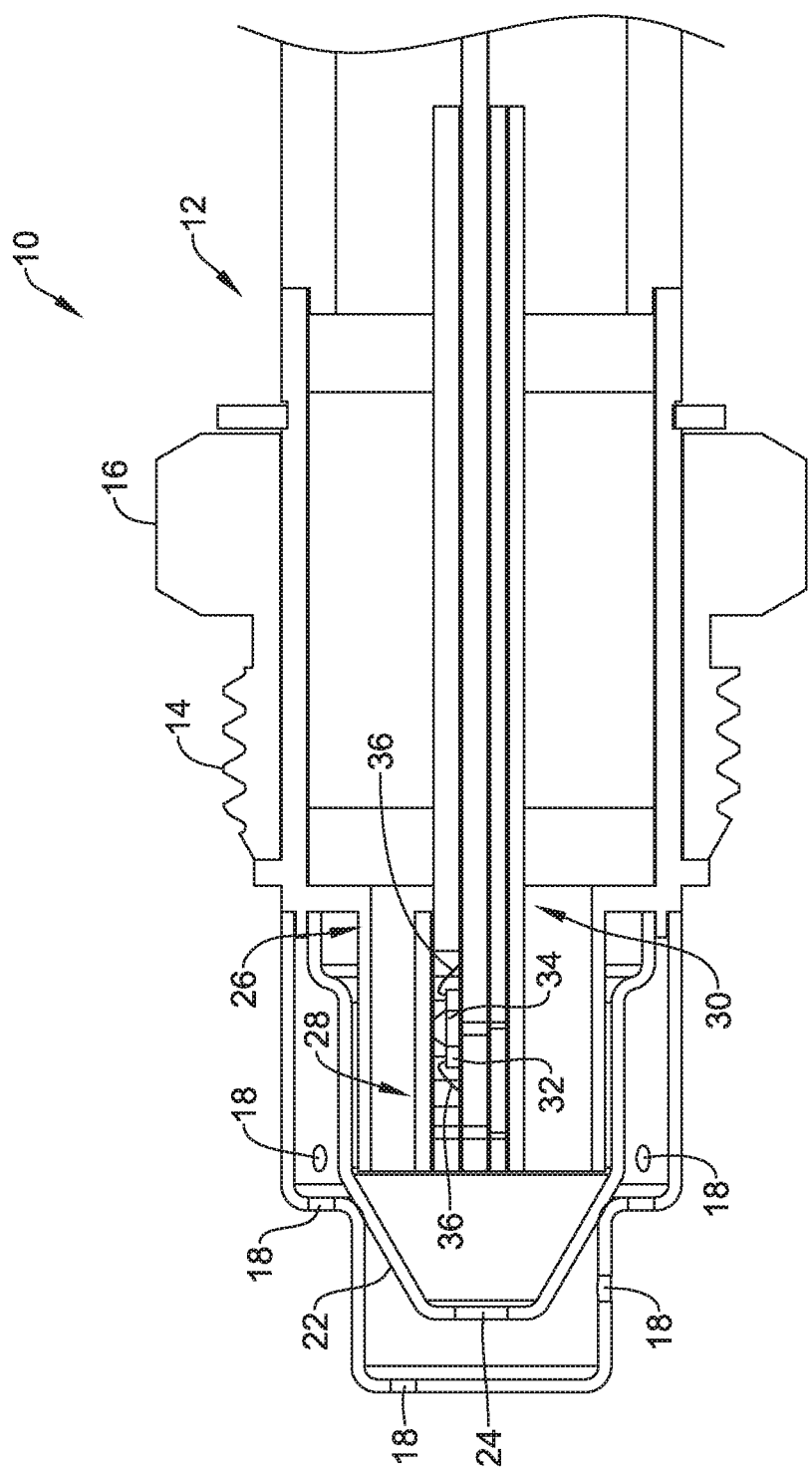
FIG. 2 is a cross-sectional side view of a portion of the illustrative gas sensor taken along line 2-2 of FIG. 1.

FIG. 2 is a cross-sectional side view of the illustrative gas sensor 10 of FIG. 1 taken along line 2-2 of FIG. 1, illustrating some of the internal components of the gas sensor 10. As can be seen, the illustrative gas sensor 10 includes an internal housing 22 that is coupled with the housing 12 and that serves to help guide gases such as exhaust gases that enter the gas sensor 10 via the apertures 18. The internal housing 22 has a primary aperture 24 that directs gases into the internal housing 22 and thus towards a sensor assembly 26. The illustrative sensor assembly 26 includes a MEMS sensing element 28 that is packaged within a ceramic structure 30. As will be discussed, the MEMS sensing element 28 may be produced in quantity from a single silicon wafer.

In some cases, as discussed herein, one of the features of the MEMS sensing element 28 is that the MEMS sensing element 28 may include a diaphragm that is formed as part of the MEMS sensing element 28. The diaphragm (shown for example in FIG. 6) may help to thermally isolate an active component of the MEMS sensing element 28. Further, when the gas sensor must be heated to operate, the diaphragm may help to minimize the thermal mass that must be heated, thereby increasing the responsiveness and/or sensitivity of the gas sensor 10. In some cases, wire bonds 36 may extend from the sense die 32 and connect bond pads on the sense die 32 to traces on the surrounding ceramic structure 30.

The MEMS sensing element 28 may include a sense die 32 that includes a substrate portion and a thinner diaphragm 34. In one example, the sense die 32 may be a Silicon-On-Insulator (SOI) sense die that includes a silicon substrate layer, an insulating layer grown on the silicon substrate, followed by an epi layer grown on the insulating layer. In some cases, a cavity is etched into the back side of the sense die, using the insulating layer as an etch stop. This leaves a thin diaphragm, formed by the insulating layer and the epi layer, upon which an active region and/or heater may be placed. Supporting circuitry may be fabricated in the epi layer, often away from the diaphragm, if desired. In another example, an aperture may be etched all the way through a first silicon wafer. A second silicon wafer may be secured to the first silicon wafer to form the diaphragm across the aperture in the first silicon wafer. A chemical and/or mechanical polishing processes may be used to thin the second silicon wafer to achieve a desired thickness for the diaphragm. These are just some example sense die. It is contemplated that the sense die 32 may have any suitable configuration. Further features of the MEMS sensing element 28 are discussed with respect to subsequent Figures.

Figure 3:
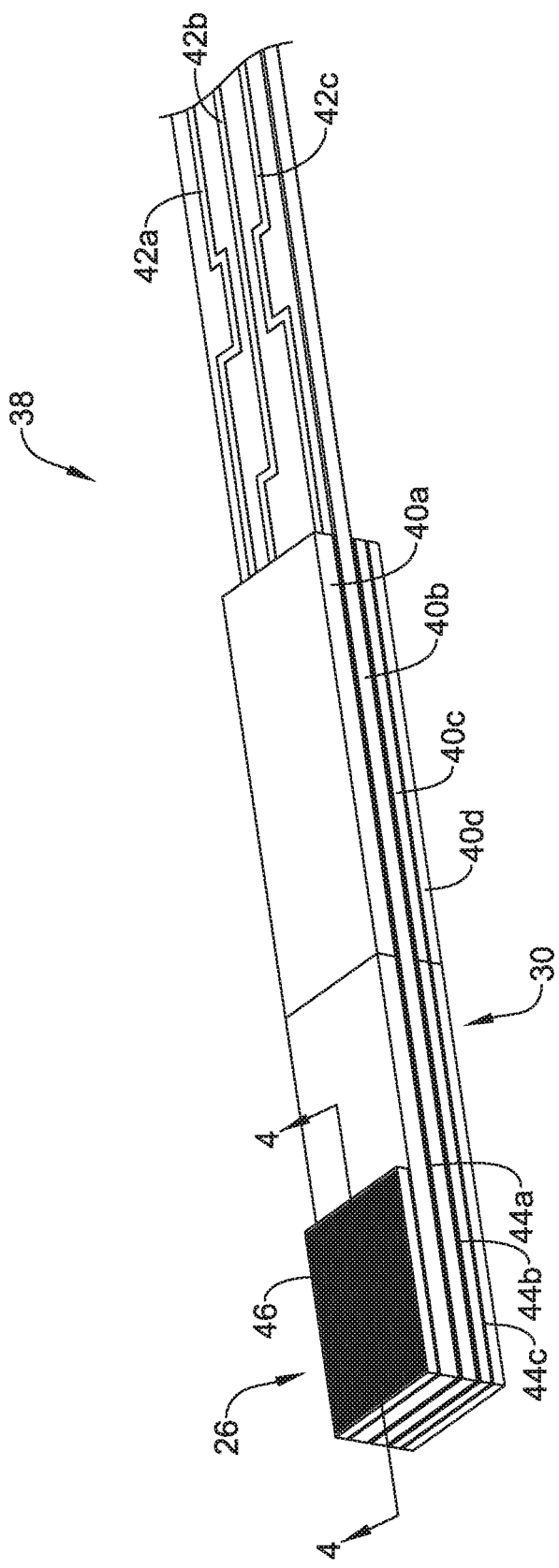
FIG. 3 is a perspective view of an illustrative sensor assembly forming a portion of the illustrative gas sensor of FIG. 1.
Figure 4:
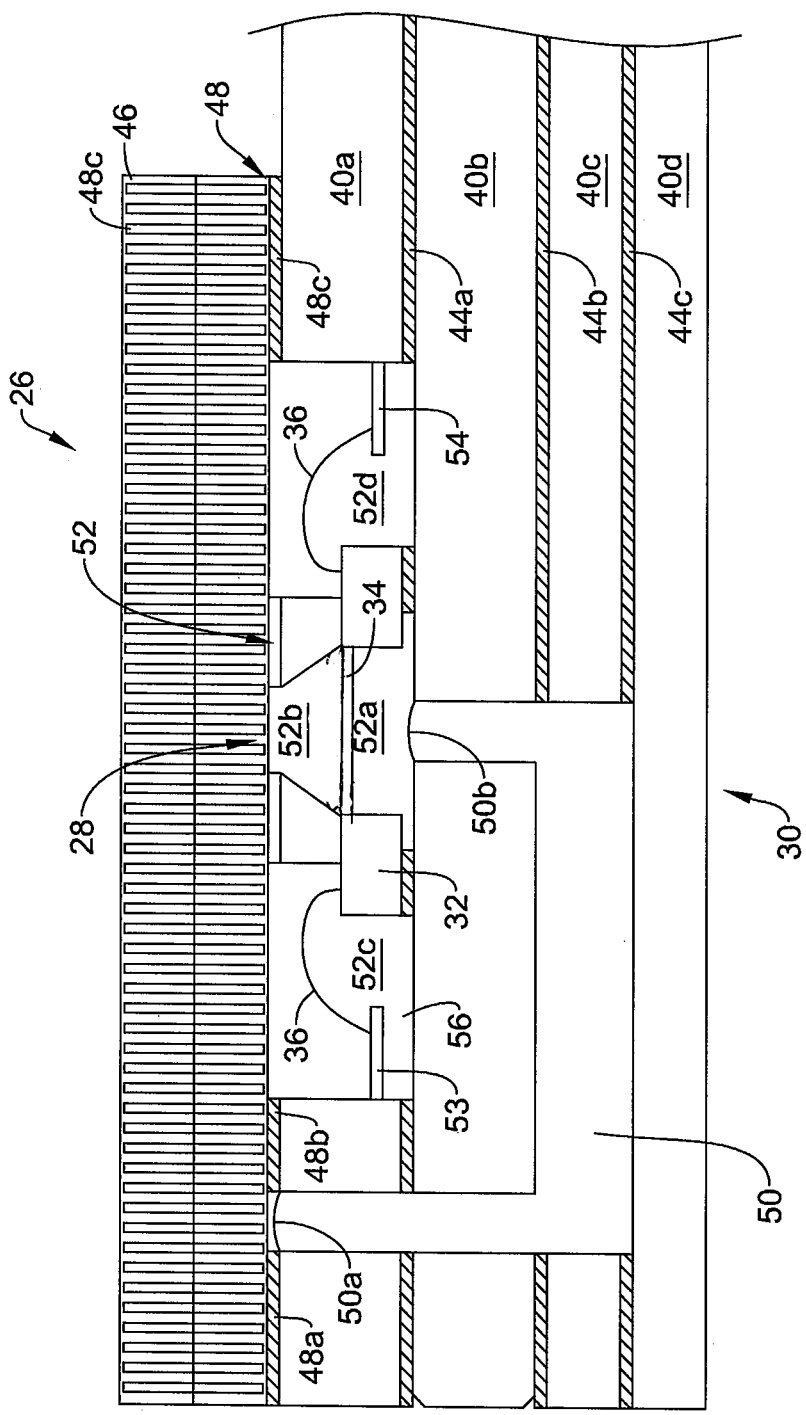
FIG. 4 is a cross-sectional side view of the illustrative sensor assembly taken along line 4-4 of FIG. 3.

FIG. 3 is a perspective view of an illustrative sensor assembly 38, which includes the MEMS sensing element 28 and the ceramic structure 30. FIG. 4 is a cross-sectional side view of the illustrative sensor assembly 38 taken along line 4-4 of FIG. 3. FIG. 4 is also tilted forward a bit, out of the page, in order to illustrate additional features of the MEMS sensing element 28. In some cases, the ceramic structure 30 may be formed of multiple ceramic layers that are secured together, but this is not required. As illustrated, for example, the assembly 38 includes an upper ceramic layer 40a and an intermediate ceramic layer 40b that continues proximally of the ceramic structure 30 and that may include electrical traces 42a, 42b, 42c. The electrical traces 42a, 42b, 42c may be deposited onto the intermediate ceramic layer 40b prior to securing the upper ceramic layer 40a thereon. In some instances, the electrical traces 42a, 42b, 42c may be formed by etching a conductive layer that was deposited or otherwise formed on the surface of the intermediate ceramic layer 40b. In other cases, the electrical traces 42a, 42b, 42c may be formed by a thick film deposition process. These are just some examples.

In some cases, the upper ceramic layer 40a may be secured to the intermediate ceramic layer 40b via an adhesive layer 44a. In some cases, the assembly 38 may include a lower ceramic layer 40c that is secured via an adhesive layer 44b as well as a lower ceramic layer 40d that is secured via an adhesive layer 44c. It will be appreciated that the ceramic structure 30 may include additional ceramic layers beyond those illustrated. In some cases, the ceramic structure 30 may include fewer ceramic layers than illustrated. For example, the ceramic structure 30 may be formed from a single ceramic layer. The illustrative ceramic structure 30 also includes a porous ceramic lid 46. In some cases, the porous ceramic lid 46 is configured to have pore sizes and/or other defining characteristics of porosity that allow exhaust gases (or other gases to be sampled) to pass through the porous ceramic lid 46. An adhesive layer 48, divided into an adhesive portion 48a, an adhesive portion 48b and an adhesive portion 48c, may help to secure the porous ceramic lid 46 to the upper ceramic layer 40a. In some cases, the adhesive layer 48 or portions thereof are fluid-impervious, and thus may help permit gases to flow through portions of the porous ceramic lid 46 lacking the adhesive layer 48 while preventing gases from flowing through portions of the porous ceramic lid 46 including the adhesive layer 48.

In some cases, the sensor assembly 26 includes venting in order to help equalize pressures on either side of the diaphragm 34. As illustrated, the sensor assembly 26 includes a vent 50 that extends from a first end 50a that is proximate the porous ceramic lid 46 and between the adhesive portions 48a and 48b, to a second end 50b that is proximate and is exposed to a cavity 52a that exists underneath the sense die 32. Because there is no adhesive layer 48 directly above the sense die 32, a cavity 52b above the diaphragm 34 is exposed to gases that pass through the porous ceramic lid 46. The vent 50 helps ensure that the cavity 52a below the diaphragm 34 and the cavity 52b above the diaphragm 34, which together form a portion of a sensor cavity 52, remain at the same or at least substantially the same pressure, which helps to relieve forces that could otherwise be applied to the diaphragm 34. In some instances, the sensor cavity 52 may also be considered as including a cavity region 52c, on a first side of the sense die 32, as well as a cavity region 52d, on a second side of the sense die 32. It is contemplated that the cavity 52c and cavity 52d may be fluidly connected, and in some cases may be considered a single cavity. It will also be appreciated that this is just one example of possible venting structures that may be employed, depending on which portions of the sensor cavity 52 are exposed to exhaust gases. Of course, if the sensor assembly 26 was a pressure sensor, the vent 50 would not be included.

Another feature shown in FIG. 4 is how the wire bonds 36 extend from bond pads on the sense die 32 to wiring traces 53 and 54 on the ceramic structure 30. It will be appreciated that the wiring traces 53 and 54 may be electrically coupled to two or more of the electrical traces 42a, 42b, 42c. By virtue of FIG. 4 being tilted forward, it is to be understood that while the wiring traces 53 and 54 appear to be floating, they are actually located on an upper surface 56 of the intermediate ceramic layer 40b. As illustrated, the wire bonds 36 and the wiring traces 53, 54 are exposed to exhaust gases (or other gases of interest) that pass through the porous ceramic lid 46. In some cases, while not illustrated, the cavity region 52c and/or the cavity region 52d may instead be filled with a potting or encapsulating material in order to help protect the wire bonds 36 and the wiring traces 53 and 54 from corrosive gases, heat, vibration and/or other environmental conditions.

Figure 5:
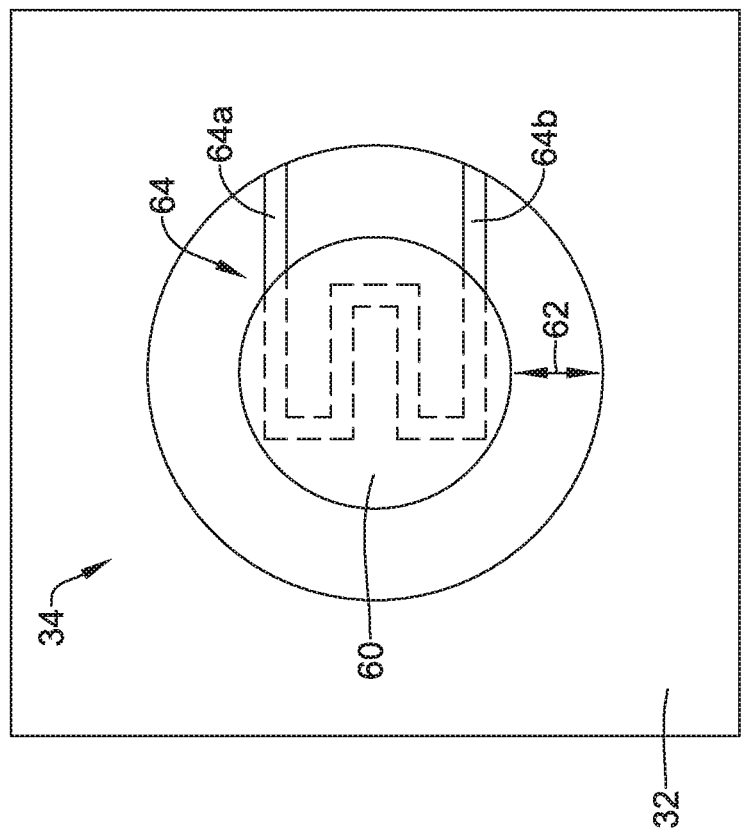
FIG. 5 is a top view of a sense die of the illustrative sensor assembly of FIG. 4.

FIG. 5 is a schematic top view of the sense die 32 of the illustrative sensor assembly of FIG. 4. The diaphragm 34 of the illustrative sense die 32 includes a gas sensing active region 60 that is deposited or otherwise formed on a diaphragm 34. The active region 60 may be spaced inward a distance 62 from the edge of the diaphragm 34. In some cases, as shown, the diaphragm 34 also includes a heater 64 that is disposed between the diaphragm 34 and the gas sensing active region 60, and/or above the gas sensing active region 60. The heater 64 is shown in dashed line, apart from terminal ends 64a and 64b that extend out from underneath the gas sensing active region 60. In some cases, the heater 64 may be periodically activated to burn off a material of interest (such as a gas or something within a gas) that has absorbed into the gas sensing active region 60. In some instances, the heater 64 may be used to preheat the gas sensing active region 60 above ambient and remain on so that the gas sensing active region 60 remains above the temperature of the exhaust gas (or other gases of interest to be sensed). These are just examples.

Figure 6:
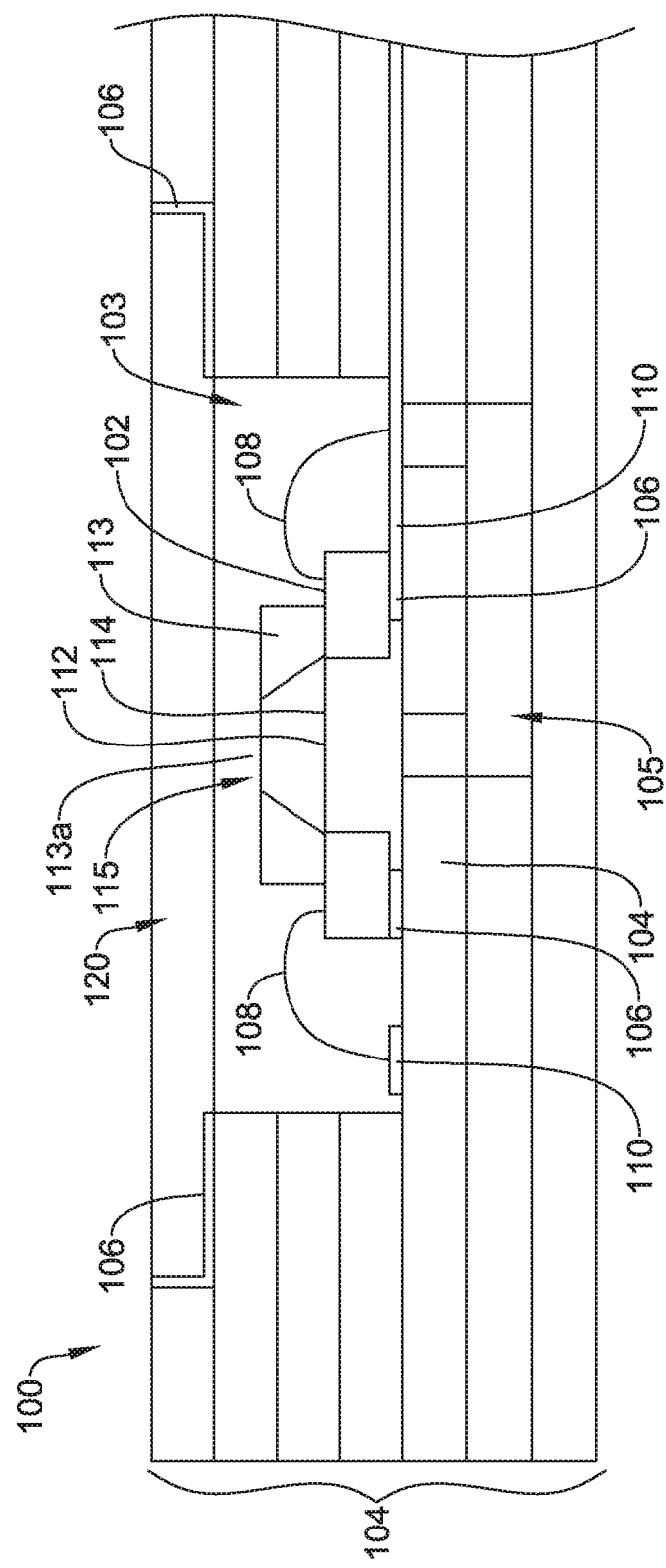
FIG. 6 is a schematic cross-sectional side view of an illustrative sensor assembly.

FIG. 6 is a schematic cross-sectional view of an illustrative sensor assembly 100. The illustrative sensor assembly 100 includes a MEMS sensing element 102 that is mounted to a ceramic substrate 104 using a high-temperature adhesive and/or ceramic cement 106. In some cases, the ceramic substrate 104 may include a plurality of layers assembled together to surround and support the other elements of the sensor assembly 100, including the MEMS sensing element 102. In some instances, the MEMS sensing element 102 may be referred to as a "sense die" and/or "sense chip." The ceramic substrate 104 may have a thermal coefficient of expansion that is well matched to that of the MEMS sensing element 102 (which may include silicon, for example) and the adhesives 106. As an example, the total thickness of the ceramic substrate 104 may be about 1-2 millimeters (mm). The sensor assembly 100 may be configured to be used at high temperatures (e.g., 200° C.) and in harsh environments. The ceramic substrate 104 may be configured to help thermally isolate the MEMS sensing element 102 from the external housing.

The MEMS sensing element 102 may have an upper surface 112 and may include a thin diaphragm 114. The sensor assembly 100 may also include a porous ceramic lid 120 that is assembled above the MEMS sensing element 102, where the porous ceramic lid 120 may be attached to the ceramic substrate 104 using a high-temperature adhesive and/or ceramic cement 106. The porous ceramic lid 120 may be attached above a cavity 103 in the ceramic substrate 104, wherein the MEMS sensing element 102 is located within the cavity 103. In some cases, as illustrated, the porous ceramic lid 120 may be spaced from the upper surface 112 of the MEMS sensing element 102. In some instances, the sensor assembly 100 may include a vent channel 105 extending within the ceramic substrate 104. The vent channel 105 may balance the pressure above and below the diaphragm 114 of the MEMS sensing element 102 by extending from a position underneath the MEMS sensing element 102 to a position where it is fluidly coupled with the cavity 103.

In some cases, as illustrated, the sensor assembly 100 includes a spacer element 113 that is disposed above the MEMS sensing element 102. In some instances, the spacer element 113 helps to protect the diaphragm 114, especially during assembly of the sensor assembly 100. The spacer 113 may include an aperture 113a that allows gases to engage an active region on the diaphragm 114. In some cases, as illustrated, the spacer element 113 is also spaced from the porous ceramic lid 120.

Wire bonds 108 (or alternatively bump bonds, ball grid array, etc.) may be used to electrically connect the MEMS sensing element 102 to bond-pads and/or electrical traces 110 on the ceramic substrate 104. The electrical traces 110 may run along the length of the ceramic substrate 104 to where a standard electrical connection can be made. In some cases, at least a portion of the area around the MEMS sensing element 102 may be filled with potting material to cover the wire bonds 108 (when wire bonds are used), while exposing an active area of the diaphragm of the MEMS sensing element 102. The sensor assembly 100 may be configured to detect one or more (potentially hazardous) gases, which may include $NO_2$, $NO_x$, $O_2$, $CO_2$, $NH_4$, and/or other gases. In some cases, the sensor assembly 100 may include additional elements that are not explicitly shown in FIG. 6, such as but not limited to a heater element, temperature sensor, signal conditioning circuitry, additional chemical and/or physical sensors, among other things.

Figure 7:
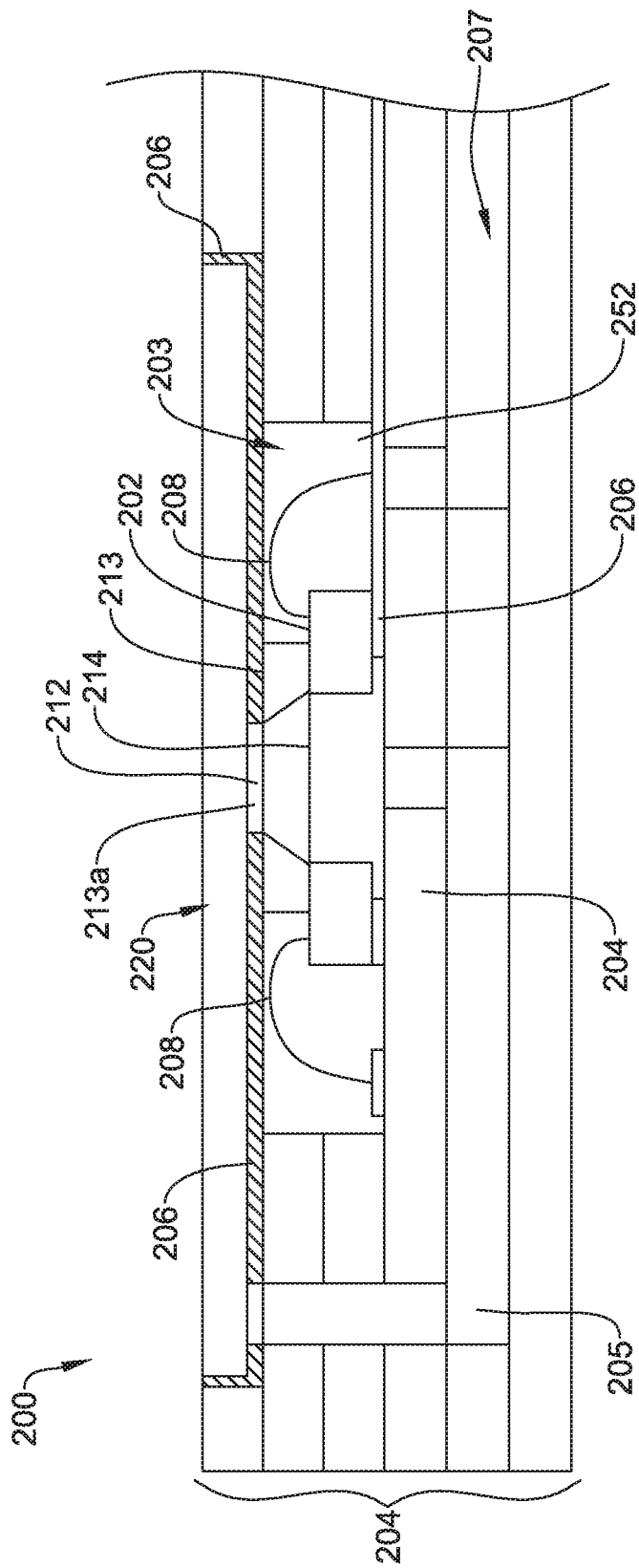
FIG. 7 is a schematic cross-sectional side view of an illustrative sensor assembly.

FIG. 7 is a schematic cross-sectional side view of an illustrative sensor assembly 200 that may be similar to the sensor assembly 100 described with respect to FIG. 6. The illustrative sensor assembly 200 may include a ceramic substrate 204 (which may be similar to the ceramic substrate 104), a MEMS sensing element 202 (which may be similar to the MEMS sensing element 102) having a diaphragm 214 and an active area (not shown), and a porous ceramic lid 220 (which may be similar to the porous ceramic lid 120) installed above the MEMS sensing element 202. The porous ceramic lid 220 may be attached above a cavity 203 in the ceramic substrate 204, wherein the MEMS sensing element 202 is located within the cavity 203.

The sensor assembly 200 may include one or more wire bonds 208 (which may be similar to the wire bonds 108) configured to electrically connect the MEMS sensing element 202 to other elements within the sensor assembly 200 and/or outside the sensor assembly 200. The sensor assembly 200 may also include one or more optional vent channels 205 and/or 207 (which may be similar to vent channel 105 of FIG. 6).

In some cases, as illustrated, the sensor assembly 200 includes a spacer element 213 that is disposed above the MEMS sensing element 202. In some instances, the spacer element 213 helps to protect the diaphragm 214, especially during assembly of the sensor assembly 200. The spacer 213 may include an aperture 213a that allows gases to engage an active region on the diaphragm 214. In some cases, as illustrated, the spacer element 213 may be in contact with and/or adhesively secured to the porous ceramic lid 220.

In FIG. 7, the ceramic substrate 204 may be modified to allow the porous ceramic lid 220 to be sealed directly to at least a portion of the spacer 213, in contact with an upper surface 212 of the spacer 213, possibly via high-temperature adhesive and/or ceramic cement 206. By sealing the porous ceramic lid 220 directly above the spacer 213, the wire bonds 208 and/or other circuitry may be protected from exposure to gas passing through the porous ceramic lid 220. To further prevent exposure of the wire bonds 208 and other elements, adhesive 206 (and/or additional blocking material) may be added to the bottom surface of the porous ceramic lid 220 (e.g., at least a portion of the bottom surface of the porous ceramic lid 220 that is not exposed to the active area of the MEMS sensing element 202 and/or a vent channel 205). By adjusting/controlling a pore size and thickness of the porous ceramic lid 220 and how the porous ceramic lid 220 is sealed above the spacer 213, the exposure of the internal sensor elements (e.g., the MEMS sensing element 202, the wire bonds 208, and any other surrounding elements) to particulates and other contaminates may be controlled.

The ceramic substrate 204 may include a first vent channel 205 configured to balance the pressure above and below the diaphragm 214. The ceramic substrate 204 may optionally include a second vent channel 207 configured to vent the cavity 252 to the atmosphere. In some cases, the second vent channel 207 may be used during assembly of the sensor assembly 200 to avoid pressure build-up which could lift the porous ceramic lid 220 from its position within the ceramic substrate 204, which may cause damage to the porous ceramic lid 220, the MEMS sensing element 202 and/or the ceramic substrate 204. In some cases, the second vent channel 207 may be sealed after the sensor assembly 200 is assembled.

Figure 8:
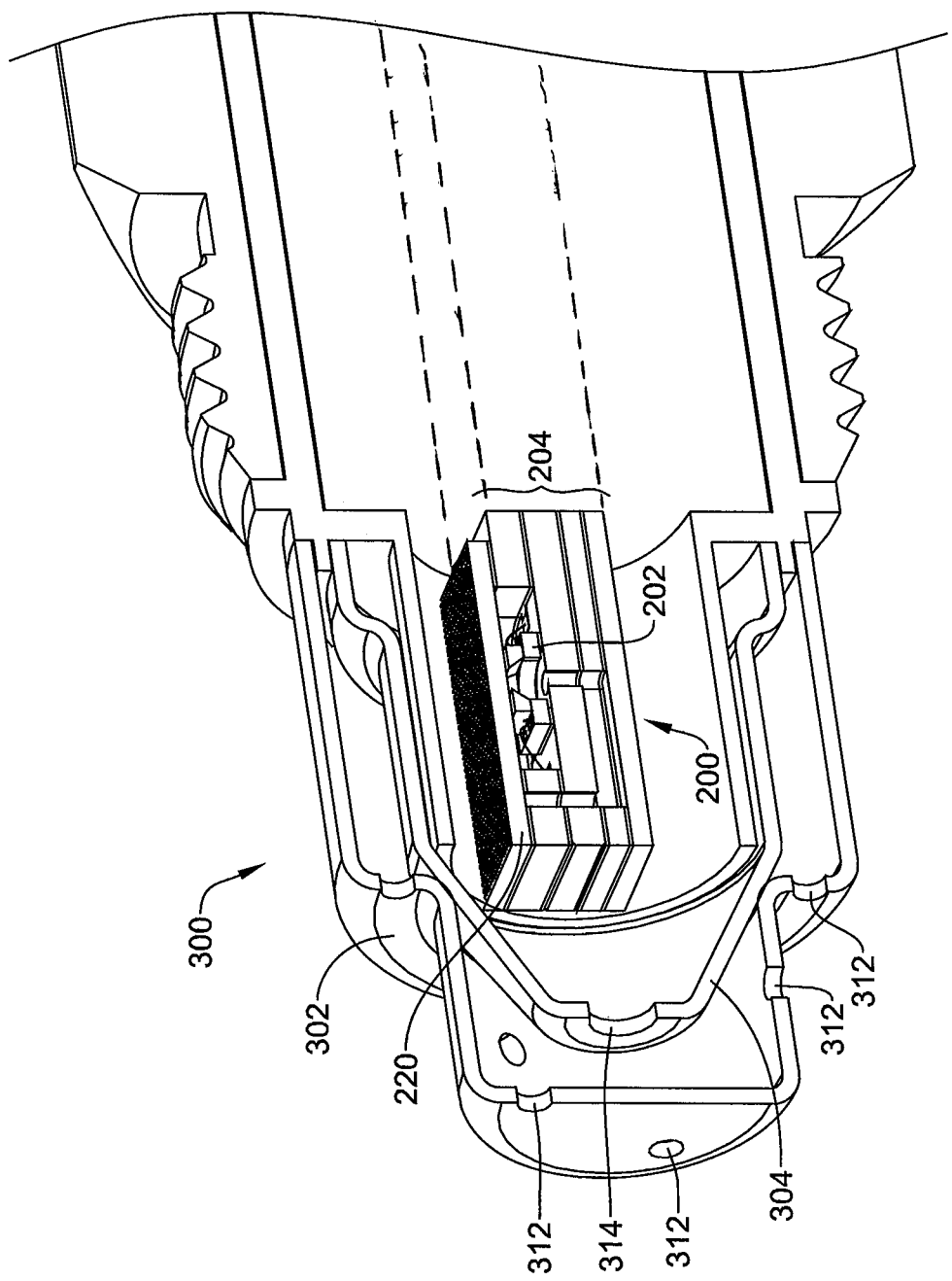
FIG. 8 is a partial cross-sectional perspective view of the illustrative sensor assembly of FIG. 7 installed within a metal housing.

FIG. 8 is a schematic cross-sectional view of the sensor assembly 200 installed within a metal housing 300. The metal housing 300 may include an outer housing 302 and an inner housing 304, where the sensor assembly 200 may be located within the inner housing 304. In some cases, the outer housing 302 may include one or more apertures 312, which may be configured to allow gases to flow toward and/or away from the sensor assembly 200. Additionally, the inner housing 304 may include one or more apertures 314, which may be configured to allow gases to flow toward and/or away from the sensor assembly 200. For example, gases from the ambient environment may flow into the outer housing 302 via the opening(s) 312. Then the gases may flow into the inner housing 304 via the opening(s) 314. Then at least a portion of the gases may pass through the porous ceramic lid 220 to interact with the MEMS sensing element 202, causing a signal to be created by the MEMS sensing element 202 indicating a characteristic of the gases in the environment around the metal housing 300.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A gas sensor for sensing a gas of interest, the gas sensor comprising:
  a ceramic carrier;
  a porous ceramic lid secured to the ceramic carrier, wherein the porous ceramic lid and the ceramic carrier define a sensor cavity;
  a gas sensor situated in the sensor cavity, wherein the gas sensor is spaced from the porous ceramic lid
    wherein the porous ceramic lid is configured to allow the gas of interest to move through at least part of the porous ceramic lid and into the sensor cavity to be sensed by the gas sensor; and
  a sensor die that defines a diaphragm,
    wherein the sensor die is secured to the ceramic carrier, with a front side of the diaphragm facing the porous ceramic lid and a back side of the diaphragm facing the ceramic carrier, and wherein the ceramic carrier includes a vent that vents the back side of the diaphragm to reduce a pressure differential across the diaphragm.

2. The gas sensor of claim 1, wherein the sensor die is a Micro Electro Mechanical System (MEMS).

3. The gas sensor of claim 1, wherein the sensor die comprises a gas sensing active region supported by the diaphragm, wherein the gas sensing active region has one or more characteristics that changes in response to exposure to the gas of interest that can be detected via the sensor die.

4. The gas sensor of claim 3, wherein the sensor die comprises a heater supported by the diaphragm for heating the gas sensing active region.

5. The gas sensor of claim 3, further comprising a spacer secured to the gas sensor and positioned between the gas sensor and the porous ceramic lid.

6. The gas sensor of claim 5, wherein the spacer is spaced from the porous ceramic lid.

7. The gas sensor of claim 1, wherein the sensor die includes:
a gas sensing active region that has one or more characteristics that changes in response to exposure to the gas of interest that can be detected via the sensor die;
a heater for heating the gas sensing active region;
electrical traces for communicating electrical signals that represent one or more of the characteristics that changes in response to exposure to the gas of interest;
bond pads operatively coupled to the electrical traces.

8. The gas sensor of claim 7, wherein the ceramic carrier comprises one or more electrical traces, and wherein one or more wire bonds electrically connect the bond pads of the sensor die to corresponding electrical traces of the ceramic carrier.

9. The gas sensor of claim 8, wherein the ceramic carrier comprises a plurality of ceramic layers, where at least some of the plurality of ceramic layers include an aperture that defines at least part of the sensor cavity.

10. The gas sensor of claim 9, wherein one or more of the electrical traces of the ceramic carrier extend between adjacent layers of the plurality of ceramic layers.

11. The gas sensor of claim 1, wherein the ceramic carrier comprises a plurality of ceramic layers, where at least some of the plurality of ceramic layers include an aperture that defines at least part of the sensor cavity.

12. A gas sensor for sensing a gas of interest, the gas sensor comprising:
a sensor die defining a diaphragm, the sensor die including a gas sensing active region supported by a first side of the diaphragm and a heater for heating the gas sensing active region;
a ceramic housing that defines a sensor cavity for housing the sensor die, the ceramic housing configured to:
expose the gas sensing active region to the gas of interest, and
vent a second side of the diaphragm, opposite to the first side, to reduce a pressure differential across the diaphragm.

13. The gas sensor of claim 12, wherein the ceramic housing comprises:
a ceramic carrier; and
a porous ceramic lid secured to the ceramic carrier, wherein the porous ceramic lid and the ceramic carrier define the sensor cavity.

14. The gas sensor of claim 13, wherein the ceramic carrier comprises a plurality of ceramic layers, where at least some of the plurality of ceramic layers include an aperture that defines at least part of the sensor cavity.

15. The gas sensor of claim 12, further comprising a metallic housing for housing the ceramic housing, the metallic housing including one or more apertures that allow the gas of interest to move from a gas source, through the one or more apertures of the metallic housing, and to the ceramic housing.

16. The gas sensor of claim 15, wherein at least part of the ceramic housing is porous to the gas of interest.

17. A gas sensor for sensing a gas of interest, the gas sensor comprising:
a sensor die defining a diaphragm, the sensor die including a gas sensing active region supported by a first side of the diaphragm and a heater for heating the gas sensing active region;
a ceramic housing that defines a sensor cavity for housing the sensor die, the ceramic housing comprises a plurality of ceramic layers, where at least some of the plurality of ceramic layers include an aperture that defines at least part of the sensor cavity; and
vent a second side of the diaphragm, opposite to the first side, to reduce a pressure differential across the diaphragm.

18. The gas sensor of claim 17, wherein the sensor die engages and is secured to the ceramic housing but the diaphragm of the sensor die does not engage the ceramic housing.

* * * * *